United States Patent Office 3,454,491
Patented July 8, 1969

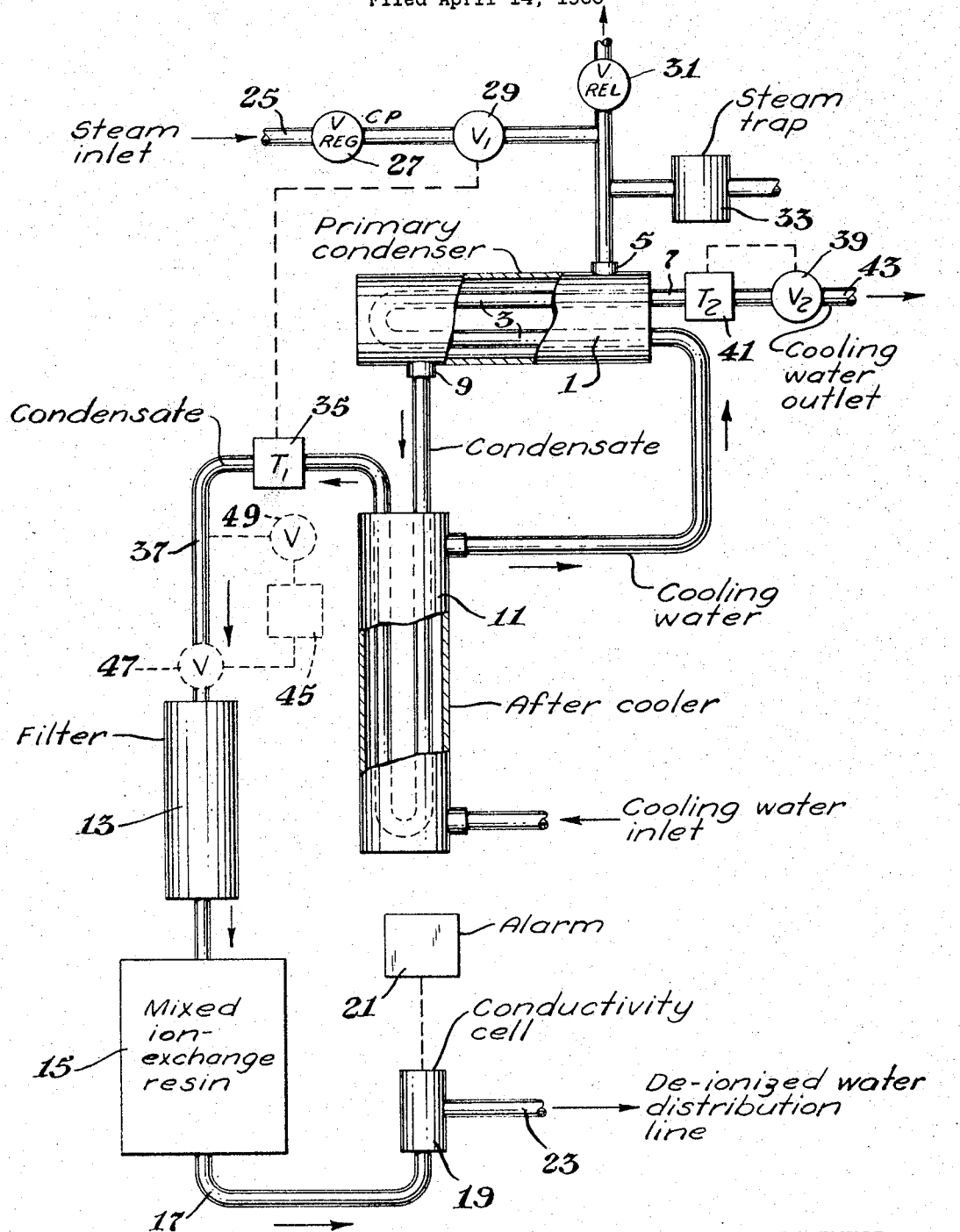

3,454,491
APPARATUS AND PROCESS FOR HIGH
PURITY DEIONIZED WATER
Lyle W. Colburn, Midland, Mich., assignor to The Dow
Chemical Company, Midland, Mich., a corporation of
Delaware
Filed Apr. 14, 1966, Ser. No. 542,492
Int. Cl. C02b 1/40; B01d 15/04, 25/06
U.S. Cl. 210—27                                7 Claims

ABSTRACT OF THE DISCLOSURE

An apparatus and process for the preparation of high purity deionized water by condensing steam and thereafter filtering and deionizing the steam condensate all in a closed system to obtain water of very high purity. Furthermore the pressure required to move the condensate through the apparatus and subsequent distribution lines is provided by the incoming steam.

BACKGROUND

Purified water required for many scientific, industrial, and medicinal applications has long been prepared by distillation. Recently mixed bed and multi-bed ion-exchange columns have been extensively used to remove electrolytes from water. Water for high pressure hydroelectric turbines or the manufacture of solid state electronic circuits is now often "polished" with a mixed bed of anion-exchange and cation-exchange resin. Yet in spite of nearly two decades of experience in the design, construction, and operation of regeneratable ion-exchange units, excessive maintenance and supervision is still required to insure reliable operation. Regeneration in particular requires precise control of reagents and flow rates as well as mastery of a complex maze of pipes and valves.

It has now been discovered that a combination of (a) a steam condenser having horizontal heat exchange tubes and a heat-exchange capacity suitable to cool the steam condensate to a temperature within the operational limits of an ion-exchange column used to deionize said condensate; (b) a steam inlet line with a constant pressure steam inlet valve and a control valve to interrupt the inlet steam if the temperature of the cooled steam condensate rises above the operational limit of the ion-exchange column; (c) a second control valve to maintain the temperature of the exit cooling water from the steam condenser between about 40–85° C.; (d) a filter; and (e) an ion-exchange column to deionize the filtered condensate, said combination being operated as a closed system with the inlet steam pressure moving the condensate through the apparatus and distribution line, yields deionized water of very high purity.

Operation is simple and automatic. The "on demand" response is rapid and the capacity is high eliminating the necessity for large storage tanks. Because the unit operates as a closed system, a very low level of dissolved gases are easily maintained. It has fail-safe provisions which permit extended operation with a minimum of attention other than a periodic check of the filter and ion-exchange column. Also the extended life of the mixed ion-exchange resin bed reduces the necessity for resin regeneration as resin replacement becomes more economical.

In quality of the deionized water, in reliability and ease of operation, and in compactness the present apparatus offers significant advantages over other water purification units of similar capacity. A small desk sized unit can produce up to 300 liters/hr. of water having a conductivity of less than 0.2 micromho/cm.

The accompanying figure illustrates an embodiment of the apparatus and process of the present invention.

Referring to the figure, primary condenser 1 with horizontal water-cooled heat exchange tubes 3, and steam inlet 5 located adjacent to cooling water outlet 7 is connected so that incoming steam will condense on an external surface of horizontal heat-exchange tubes 3. Connected in sequence to condensate outlet 9 of primary condenser 1 is after cooler 11, filter 13 and ion-exchange column 15 containing a bed of mixed anion- and cation-exchange resin. Outlet line 17 from ion-exchange column 15 is connected to conductivity cell 19 including alarm 21 and then to deionized water distribution line 23. Steam inlet line 25 having constant pressure valve 27, thermostatically controlled valve 29, pressure release valve 31 and steam trap 33 is connected to steam inlet 5 of primary condsenser 1. Thermostatically controlled valve 29 is responsive to temperature sensor 35 in condensate line 37 between after cooler 11 and filter 13. Thermostatically controlled valve 39 is connected to cooling water outlet line 7 of primary condenser 1 and is responsive to temperature sensor 41 operatively coupled to cooling water outlet line 43 at a position adjacent to the junction of primary condenser 1 and cooling water outlet line 43.

Steam inlet line 25, primary condenser 1, after cooler 11, filter 13, ion-exchange column 15, conductivity cell 19, and deionized water distribution line 23 are connected as a closed system so that the inlet steam pressure provides the means for moving the steam condensate through the apparatus and into distribution line 23.

In operation steam at a constant pressure between about 10–100 pounds per square inch gauge (p.s.i.g.) controlled by constant pressure valve 27 passes into primary condenser 1 and is condensed on an external surface of water-cooled heat exchange tubes 3. The steam condensate from primary condenser 1 is further cooled in after cooler 11 to a temperature of 50° C. or less. Then it passes through filter 13 and ion-exchange column 15. Finally the sterile, deionized water from ion-exhange column 15 passes through monitoring conductivity cell 19 and into deionized water distribution line 23.

Because the apparatus is a closed system, it is, except for steam inlet line 25 and primary condenser 1 normally completely filled with steam condensate. Steam trap 33 in a T just above primary condenser 1 prevents condensate back-up into steam inlet line 25. Flow of steam, condensate and deionized water is automatic with the opening of any outlet valve in the distribution line. It permits a rapid response and provides a minimum opportunity for entrainment of gases. Particularly with a high quality deaerated steam feed, the product water is essentially gas-free when taken from the distribution line.

To achieve automatic, fail-safe operation valves $V_1$ and $V_2$ controlled by temperature sensors $T_1$ and $T_2$ are important elements. Valve $V_1$ in the steam inlet line ahead of primary condenser is responsive to the temperature of the condensate entering the filter and ion-exchange column. Since conventional anion-exchange resins used in mixed bed columns have limited thermal stability above 50° C., valve $V_1$ is set to interrupt the steam feed whenever the condensate temperature at $T_1$ exceeds about 50° C. and thereby prevent hot condensate or steam from entering the filter and ion-exchange column. Particularly suitable is a solenoid valve at $V_1$ controlled by a reverse acting thermoswitch responsive to temperature sensor $T_1$. In normal action valve $V_1$ is held open unless the temperature of the cooled condensate exceeds a preset value of about 50° C. The solenoid valve $V_1$ also can be set to close the steam inlet line in case of a power failure thus adding another fail-safe element.

Another control element is modulating thermostatically controlled valve $V_2$ on cooling water outlet line from the primary condenser. Valve $V_2$ is responsive to temperature sensor $T_2$ operatively coupled to cooling water outlet line at a position adjacent to the junction of the primary condenser and the cooling water outlet line. In normal operation valve $V_2$ is set to control the temperature of the cooling water at $T_2$ between about 40–85° C. by modulating the flow of cooling water. Outside these limits, excessive steam hammering or inadequate cooling occurs.

The importance of this control of the outlet cooling water temperature seems related to the necessity to limit the temperature differential between the inlet steam and the heat exchange tubes in the primary condenser to prevent steam hammering. Tests showed that in general the temperature differential between the inlet steam and the cooling water in the heat exchange tube near the point of initial contact should be 85° C. or less to achieve quiet operation. The optimum range in cooling water temperature at $T_2$ will thus vary somewhat within the general range of about 40–85° C. indicated above. It will depend both on the particular inlet steam temperature, i.e., the inlet steam pressure, and the design and capacity of the condenser. However, within the general range of about 40–85° C., the optimum operating conditions can be easily determined.

A further control element is the conductivity cell installed in ion-exchange column outlet line to monitor continuously the conductivity of the deionized water. It is usually connected to activate an alarm and shut down the apparatus if the conductivity rises above a preset value, normally in the range from 1–10 micromho/cm.

These control elements—solenoid valve $V_1$ responsive to the temperature of the cooled steam condensate and to a power failure, valve $V_2$ controlling the flow of cooling water from the primary condenser, and the conductivity cell monitoring the produced deionized water—suffice for automatic, fail-safe operation of this apparatus and process for preparing sterile, deionized water. If desired additional control interlocks and instrumentation can be added.

Another important factor in the smooth operation of this deionization apparatus unit is the positioning of the primary condenser. It should be mounted in a substantially horizontal position with steam inlet 5 on the upper surface near cooling water outlet 7. Furthermore steam should flow and condense on the outside of the heat-exchange tubes. This inside-out arrangement with the cooling water flowing inside heat-exchange tubes coupled with the substantially horizontal positioning of the primary condenser, the location of steam inlet 5 near cooling water outlet 7, and control of the outlet cooling water temperature at $T_2$ between about 40–85° C. achieve efficient steam condensation without noisy and dangerous steam hammering. Other arrangements, such as vertical positioning of the primary condenser or steam flow inside the heat-exchange tubes, cause noisy operation and at times such violent steam hammering that the apparatus must be shut down.

For a low capacity unit a single primary condenser of suitable size may suffice both to condense the steam and cool the condensate below 50° C. However, it is generally preferable and more efficient to employ a second condenser as an after-cooler with the cooling water flowing first through the after cooler and then the primary condenser. The positioning of the after cooler is not critical although the condensate normally flows inside the heat-exchange tubes.

Water is preferred as a coolant in the condensers. However, air, ethylene glycol or other suitable heat-exchange fluids can be used if desired.

If desired, a condensate storage tank 45 with valves 47 and 49 can be added to the system between the after cooler and filter or ion-exchange column. However, it should be kept completely full during operation to minimize gas entrainment. By appropriate valving such a condensate tank pressured with an inert gas such as nitrogen could serve as an emergency feed source for the ion-exchange column if the steam pressure were interrupted.

Normally duplicate filter units are installed in parallel to permit replacement without interrupting service. A commercial glass wool filter is quite satisfactory for general service. Yet at times it may be desirable to use in addition an active absorbent such as activated charcoal to remove neutral organic impurities that are not caught by a glass wool filter or absorbed by the ion-exchange column. Such a filter with an active absorbent is usually installed in the outlet line from ion-exchange column.

The ion-exchange column also normally consists of two parallel units. Each unit is loaded with a conventional mixture of a strong anion-exchange resin and a strong cation-exchange resin.

The ion-exchange column and the subsequent distribution lines for the deionized water must be of a material suitable for handling deionized water. Preferably the resin columns are lined with unplasticized polyvinylchloride while polyvinylchloride tubing and pipes are used in the distribution system. Alternately polytetrafluoroethylene or other inert plastic can be used. Copper, bronze, admiralty brass and certain types of iron and steel can be used in the condensers, filters and associated lines.

Within the scope of the present invention, equipment and conditions for optimum operation can be determined in routine manner. To illustrate a specific embodiment of the invention, the following detailed description is given of an experimental laboratory unit which produced up to about 75 gal./hr. (about 300 liters/hr.) of deionized water having a conductivity of 0.1–0.3 micromhos/cm.

An experimental deionization apparatus was set up as shown in the figure with the addition of a stainless steel condensate tank just ahead of the filter. Two tube and sheet condensers with 3/8″ admiralty brass heat-exchange tubes having a total cooling surface area of about 23 sq. ft. each were used as primary condenser and after cooler. The primary condenser was mounted horizontally with the steam and condensate flowing outside of the heat-exchange tubes to minimize steam hammering and superheating of the condensate.

The steam inlet line to the primary condenser contained an adjustable constant pressure regulator valve, a reverse-acting solenoid valve, a pressure relief valve and a steam trap. The temperature sensor for the solenoid valve was inserted in the condensate line below the after cooler. The solenoid was set to hold the valve open during normal operation unless the condensate temperature rose above 50° C. or there was a power failure.

A modulating temperature control valve was installed in the cooling water outlet line from the primary condenser with the temperature sensor located in the line as close as possible to the junction of the outlet line and the condenser shell. In operation this valve was set to hold the temperature of the outlet water between about 40–85° C.

The filter was a pair of 3″ x 12″ cylindrical copper steamline driers filled with a commercial glass wool filtering fiber installed in parallel and valved so that either filter could be replaced without interrupting the flow through the other. Normally both filters were operated together to minimize pressure drop.

Two parallel 6″ x 36″ vertical polyvinyl chloride lined ion-exchange columns each having a capacity of about 0.5 ft.$^3$ of mixed ion-exchange resin were used. Each column contained two parts by volume of a strong quaternary ammonium anion-exchange resin in hydroxide form (Dowex 1–X8 resin, 20–50 mesh, OH$^-$ form) thoroughly mixed with one part by volume of a sulfonic acid cation exchange resin in acid form (Dowex 50–X8 resin, 20–50 mesh. H$^+$ form). The resin columns were operated concurrently except when one was removed for regeneration or replacement of the resin.

A conductivity cell with a range of 0–10 micromhos/cm., was installed to monitor the quality of the deionized water. It was connected to sound an alarm and close the steam inlet line if the conductivity rose above a preset level within the range from 0.2–10 micromhos/cm. For general laboratory use, the alarm was set at 2–3 micromhos/cm.

Except for the optional condensate storage tank, these units and associated piping can be assembled into a compact apparatus about the size of a small desk. In experimental tests using a ¾" I.D. steam inlet line and an inlet steam pressure of about 65 pounds per sq. in. gauge (p.s.i.g.) this unit has provided up to 75 gal./hr. of deionized water having a conductivity of 0.1–0.3 micromhos/cm.

To prevent steam hammering it was necessary to maintain a temperature differential of 85° C. or less between the inlet steam and the outlet cooling water from the primary condenser at $T_2$. For example, when the inlet steam pressure was increased from 10 p.s.i.g. (116° C.) to about 60 p.s.i.g. (153° C.) the minimum outlet cooling water temperature below which steam hammering became evident increased from about 40° C. to about 70° C. The optimum coolant temperature range for a given inlet steam pressure was easily established in a few minutes.

In an extended operational test, the above apparatus was used to supply deionized water for a moderate sized laboratory, a minimum steam inlet pressure of about 20 and distribution of the purified water throughout the laboratory, a minimum steam inlet pressure of about 20 p.s.i.g. was required. With a steam inlet pressure of 30–65 p.s.i.g., operation on an "on demand" basis was automatic and trouble-free. The unit provided deionized water with a conductivity of 0.1–0.3 micromhos/cm. for a period of months with only periodic inspection of the filters and ion-exchange columns for replacement or regeneration.

I claim:

1. An apparatus for the production of deionized water which comprises, in combination and in operational sequence:
    (a) a steam condenser having at least one horizontal heat-exchange tube connected to an inlet and outlet for passing a coolant within the heat-exchange tubes, a steam inlet located near the coolant outlet and connected so that incoming steam condenses on an external surface of said horizontal heat-exchange tube, and an outlet line for the steam condensate said condenser having a heat-exchange capacity suitable to cool the steam condensate to a temperature within the operational limits of an ion-exchange column used to deionize said condensate;
    (b) a steam inlet line connected to the steam condenser having a constant pressure steam inlet valve and a thermostatically controlled valve operationally coupled to a temperature sensor disposed in the cooled steam condensate outlet line from the condenser, said thermostatically controlled valve being adapted to interrupt the inlet flow of steam if the temperature of the cooled steam condensate at the temperature sensor rises above the operational limit of the ion-exchange column;
    (c) a second thermostatically controlled valve coupled to the coolant outlet line of the steam condenser and operatively responsive to a temperature sensor disposed in the coolant outlet line at a position adjacent to the junction of the steam condenser and the coolant outlet line so that in operation said second valve controls the flow of coolant to maintain the temperature of the exit coolant from the steam condenser between about 40–85° C.;
    (d) a filter for the cooled steam condensate connected to the cooled steam condensate outlet line from the condenser; and
    (e) an ion-exchange column connected to the filter for deionizing the filtered steam condensate with an outlet line for the deionized condensate;
said steam condenser, filter, and ion-exchange column being operationally connected as a closed system whereby in operation the pressure of the steam entering the steam condenser provides the means for moving the steam condensate through the apparatus.

2. The apparatus of claim 1 wherein the coolant is water and the condensed steam is cooled in a separate after cooler to a temperature less than about 50° C.

3. The apparatus of claim 2 wherein a monitoring conductivity cell is inserted into the outlet line from the ion-exchange column.

4. The apparatus of claim 3 wherein a condensate reservoir is installed in the condensate line between the after cooler and the filter.

5. A process for the production of deionized water which comprises:
    (a) condensing steam on an external horizontal heat-exchange surface cooled by a flowing coolant having an exit temperature of about 40–85° C.;
    (b) cooling the steam condensate to a temperature within the operational limits of a mixed bed ion-exchange column suitable for deionizing said condensate;
    (c) sensing the exit temperature of the coolant and controling the flow rate of the coolant in response to the exit temperature to maintain the exit temperature within the range of 40–85° C. and to thus maintain the temperature of the steam condensate within the operational limits of a mixed bed ion-exchange column,
    (d) filtering the cooled condensate to remove suspended particles; and thereafter
    (e) deionizing the filtered condensate by passing it through a mixed bed of anion-exchange and cation-exchange resin;
said process being carried out in a closed system wherein the pressure of the inlet steam provides the means for moving the steam condensate through the process.

6. The process of claim 5 wherein the coolant is water and the condensate is cooled to less than about 50° C. prior to filtering.

7. The process of claim 5 wherein the inlet steam has a pressure of 10–100 p.s.i.g.

References Cited

UNITED STATES PATENTS

| 506,292 | 10/1893 | Wheeler et al. | 210—167 |
| 2,048,046 | 7/1936 | Angely | 210—167 X |
| 2,254,917 | 9/1941 | Schroder | 165—40 X |
| 2,474,155 | 6/1949 | Melzer | 165—40 |
| 2,617,766 | 11/1952 | Emmett et al. | 210—25 |
| 2,752,309 | 6/1956 | Emmons et al. | 210—37 X |
| 2,792,343 | 5/1957 | Vogler | 210—25 |
| 3,276,458 | 10/1966 | Iversen et al. | 210—167 X |
| 3,312,616 | 4/1967 | Ulmer et al. | 210—37 X |
| 3,385,787 | 4/1967 | Crits et al. | 210—38 X |

FOREIGN PATENTS

| 738,876 | 10/1955 | Great Britain. |
| 994,374 | 6/1965 | Great Britain. |

REUBEN FRIEDMAN, *Primary Examiner.*

C. M. DITLOW, *Assistant Examiner.*

U.S. Cl. X.R.

165—40; 210—37, 38, 85, 149, 167, 181, 182, 259